(12) United States Patent
Wang

(10) Patent No.: US 11,995,618 B2
(45) Date of Patent: May 28, 2024

(54) BLOCKCHAIN NETWORK INTERACTION CONTROLLER

(71) Applicant: Visa International Service Association, San Francisco, CA (US)

(72) Inventor: Quan Wang, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/238,027

(22) Filed: Apr. 22, 2021

(65) Prior Publication Data
US 2021/0243033 A1 Aug. 5, 2021

Related U.S. Application Data

(63) Continuation of application No. 16/613,494, filed as application No. PCT/US2017/038002 on Jun. 16, 2017, now Pat. No. 11,823,141.

(51) Int. Cl.
*G06Q 20/06* (2012.01)
*G06Q 20/38* (2012.01)
(Continued)

(52) U.S. Cl.
CPC ........... *G06Q 20/06* (2013.01); *G06Q 20/065* (2013.01); *G06Q 20/3827* (2013.01);
(Continued)

(58) Field of Classification Search
None
See application file for complete search history.

(56) References Cited

U.S. PATENT DOCUMENTS

2009/0061869 A1* 3/2009 Bui ............... H04L 61/5061
455/435.1
2009/0081989 A1 3/2009 Wuhrer
(Continued)

FOREIGN PATENT DOCUMENTS

CN 105719185 A 6/2016
CN 106530083 A 3/2017
(Continued)

OTHER PUBLICATIONS

EP17913517.3, "Office Action", dated Dec. 22, 2021, 7 pages.
(Continued)

*Primary Examiner* — Steven S Kim
*Assistant Examiner* — Jason B Fenstermacher
(74) *Attorney, Agent, or Firm* — Kilpatrick Townsend & Stockton LLP

(57) ABSTRACT

Described herein are systems and methods for virtualizing policy enforcement amongst participants of an overlay network. In some embodiments, each of the participants may maintain a separate blockchain network. The overlay network may receive smart contracts or other policy documents that include information on interactions with a particular participant or between participants. A controller, which may be implemented on any node of the overlay network, may then extract an interaction algorithm from that smart contract that may be stored in policy data to be used in completing transactions between two participants of the overlay network. In some embodiments, the policy data may include cost data which may be used to determine how two entities may interact.

14 Claims, 7 Drawing Sheets

(51) Int. Cl.
  *H04L 9/00* (2022.01)
  *H04L 9/06* (2006.01)
  *H04L 9/32* (2006.01)

(52) U.S. Cl.
  CPC ....... *G06Q 20/3829* (2013.01); *G06Q 20/389* (2013.01); *H04L 9/50* (2022.05); *G06Q 2220/00* (2013.01); *H04L 9/0637* (2013.01); *H04L 9/3239* (2013.01); *H04L 2209/56* (2013.01)

(56) References Cited

U.S. PATENT DOCUMENTS

| | | | |
|---|---|---|---|
| 2009/0122724 | A1 | 5/2009 | Rosenberg |
| 2010/0054241 | A1* | 3/2010 | Shah ............... H04L 45/70 370/389 |
| 2011/0276717 | A1* | 11/2011 | Bellamy, III ......... G06Q 20/02 709/238 |
| 2012/0084425 | A1* | 4/2012 | Riley ............... H04M 15/7657 709/223 |
| 2013/0339250 | A1* | 12/2013 | Katzin ................ G06Q 20/40 705/44 |
| 2017/0011460 | A1 | 1/2017 | Molinari et al. |
| 2017/0032365 | A1 | 2/2017 | Liberty et al. |
| 2017/0046526 | A1 | 2/2017 | Chan et al. |
| 2017/0046693 | A1* | 2/2017 | Haldenby ............. G06Q 50/18 |
| 2017/0132626 | A1 | 5/2017 | Kennedy |
| 2017/0243287 | A1 | 8/2017 | Johnsrud et al. |
| 2018/0113752 | A1* | 4/2018 | Derbakova ........... G06Q 40/025 |
| 2018/0288022 | A1* | 10/2018 | Madisetti ............. H04L 63/061 |
| 2019/0068365 | A1* | 2/2019 | Wright ................. G06F 16/137 |
| 2019/0340703 | A1 | 11/2019 | West et al. |

FOREIGN PATENT DOCUMENTS

| | | |
|---|---|---|
| CN | 107301536 A | 10/2017 |
| KR | 101628007 B1 | 6/2016 |
| KR | 101701131 B1 | 2/2017 |

OTHER PUBLICATIONS

Buterin , "R3 Reports Chain Interoperability Contents", Available Online at: https ://www .r3.com/wp-content/uploads/2017 /06/chain_interoperabi lity r3.pdf, Sep. 9, 2016, 20 pages.
EP17913517.3 , "Extended European Search Report", dated May 18, 2020, 6 pages.
PCT/US2017/038002 , "International Preliminary Report on Patentability", dated Dec. 26, 2019, 7 pages.
PCT/US2017/038002 , "PCT Search Report", dated Feb. 9, 2018, 10 pages.
Wang et al., "Blockchain Router: A Cross-Chain Communication Protocol", Informatics, Environment, Energy and Applications, Mar. 29, 2017, pp. 94-97.
U.S. Appl. No. 16/613,494 , First Action Interview Office Action Summary, dated Aug. 12, 2022, 30 pages.
U.S. Appl. No. 16/613,494 , First Action Interview Pilot Program Pre-Interview Communication, dated Jun. 22, 2022, 32 pages.
Buterin , "Chain Interoperability", R3 Reports; Available Online at: https://www.r3.com/wpcontent/uploads/2017/06/chain_interoperability_r3.pdf, Sep. 9, 2016, 20 pages.
Herudek , "Decentralized Intelligent Organizations for Blockchain Interchange Formats", Wayback Machine, Available Online at: https://web.archive.org/web/20170613044723/https://www.w3.org/2016/04/blockchain-workshop/interest/herudek.html, Jun. 13, 2017, 3 pages.
Li et al., "Towards Scalable and Private Industrial Blockchains", Proceedings of the ACM Workshop on Blockchain, Cryptocurrencies and Contracts, Apr. 2, 2017, pp. 9-14.
Application No. SG10202112811T , Written Opinion, dated Jul. 25, 2022, 11 pages.
U.S. Appl. No. 16/613,494 , "Advisory Action", dated Feb. 24, 2023, 4 pages.
U.S. Appl. No. 16/613,494 , "Final Office Action", dated Jan. 5, 2023, 33 pages.
CN201780091974.7 , "Office Action", dated Mar. 29, 2023, 22 pages.
CN201780091974.7 , "Office Action", dated Dec. 29, 2023, 13 pages.

* cited by examiner

BLOCKCHAIN NETWORK INTERACTION CONTROLLER

This application is a Continuation of U.S. patent application Ser. No. 16/613,494, filed Nov. 14, 2019, which is a National Stage of International Application No. PCT/US2017/038002, filed Jun. 16, 2017, the disclosures of which are herein incorporated by reference in their entirety for all purposes.

BACKGROUND

Blockchain technology is quickly expanding beyond the use of digital currencies. Currently, a blockchain is a transaction database shared by all nodes participating in a system based on a blockchain protocol. A blockchain may include a number of blocks of interaction records. Each block in the blockchain can also include a timestamp and a link to a previous block. For example, each block may include or be appended to a hash of the previous block. Stated differently, interaction records in a blockchain may be stored as a series of "blocks." or permanent files that include a record of a number of transactions occurring over a given period of time. Blocks may be appended to a blockchain by a blockchain provider after it completes the block and the block is validated. A blockchain may be distributed, and a copy of the blockchain may be maintained at one or more locations. In some examples, the blockchain can be used to verify transactions. The security of a blockchain may be obtained using a cryptographic scheme.

Because blockchain technology enables a decentralized approach to database management, some entities also use blockchain networks as an alternative to typical database management systems, in which various services are performed using one or more applications distributed across a blockchain network. However, these blockchain networks are often developed independently by the respective entities and may not use the same protocols (e.g., a common data format, common security protocols, etc.). When two or more entities that use these blockchain networks choose to interact (e.g., one entity wishes to engage a service provided by the other entity), there may be conflicts between the two entities regarding which protocols should take precedence.

Embodiments of the invention address these and other problems, individually and collectively.

BRIEF SUMMARY

Embodiments of the invention are directed to techniques for virtualizing policy enforcement amongst participants of an overlay network. In some embodiments, each of the participants may maintain a separate blockchain network. In some embodiments, the overlay network may receive smart contracts or other policy documents that include information on interacting with a particular participant or participants. A controller, which may be implemented on any node of the overlay network, may then extract an interaction algorithm from that smart contract that may be stored in policy data to be used in completing transactions between two participants of the overlay network. In some embodiments, the policy data may include cost data (e.g., monetary costs, resource costs, etc.), which may be used to determine how two entities may interact.

One embodiment of the invention is directed to a computer-implemented method, comprising: receiving, by a controller and from a first entity associated with a first blockchain network, a request to conduct a transaction via a virtual environment associated with the controller; identifying a first set of policies associated with the first entity; determining, based on the first set of polices, a second entity associated with a second blockchain network with which to conduct the transaction; identifying a second set of policies associated with the second entity; and facilitating the transaction between the first entity and the second entity using the first set of policies and the second set of policies.

Another embodiment of the invention is directed to a blockchain node server comprising a processor, and a computer readable medium coupled to the processor, the computer readable medium comprising code for causing the processor to: receive, from a first entity associated with a first blockchain network, a request to conduct a transaction via a virtual environment; identify a first set of policies associated with the first entity; determine, based on the first set of polices, a second entity associated with a second blockchain network with which to conduct the transaction; identify a second set of policies associated with the second entity; and facilitate the transaction between the first entity and the second entity using the first set of policies and the second set of policies.

Another embodiment of the invention is directed to a blockchain router comprising: one or more processors; and a memory including instructions that, when executed by the one or more processors, cause the one or more processors to: receive, from an overlay network, a request to complete a transaction using a blockchain network accessed via the blockchain router; determine, based on the request, an originator of the request; identify, within policy information stored in a blockchain ledger, one or more policies associated with the originator; determine, based on the policy information, one or more constraints associated with the originator of the request; and provide instructions to the blockchain to cause the blockchain to complete the transaction in accordance with the one or more constraints.

These and other embodiments of the invention are described in further detail below.

DETAILED DESCRIPTION

Figure 1:
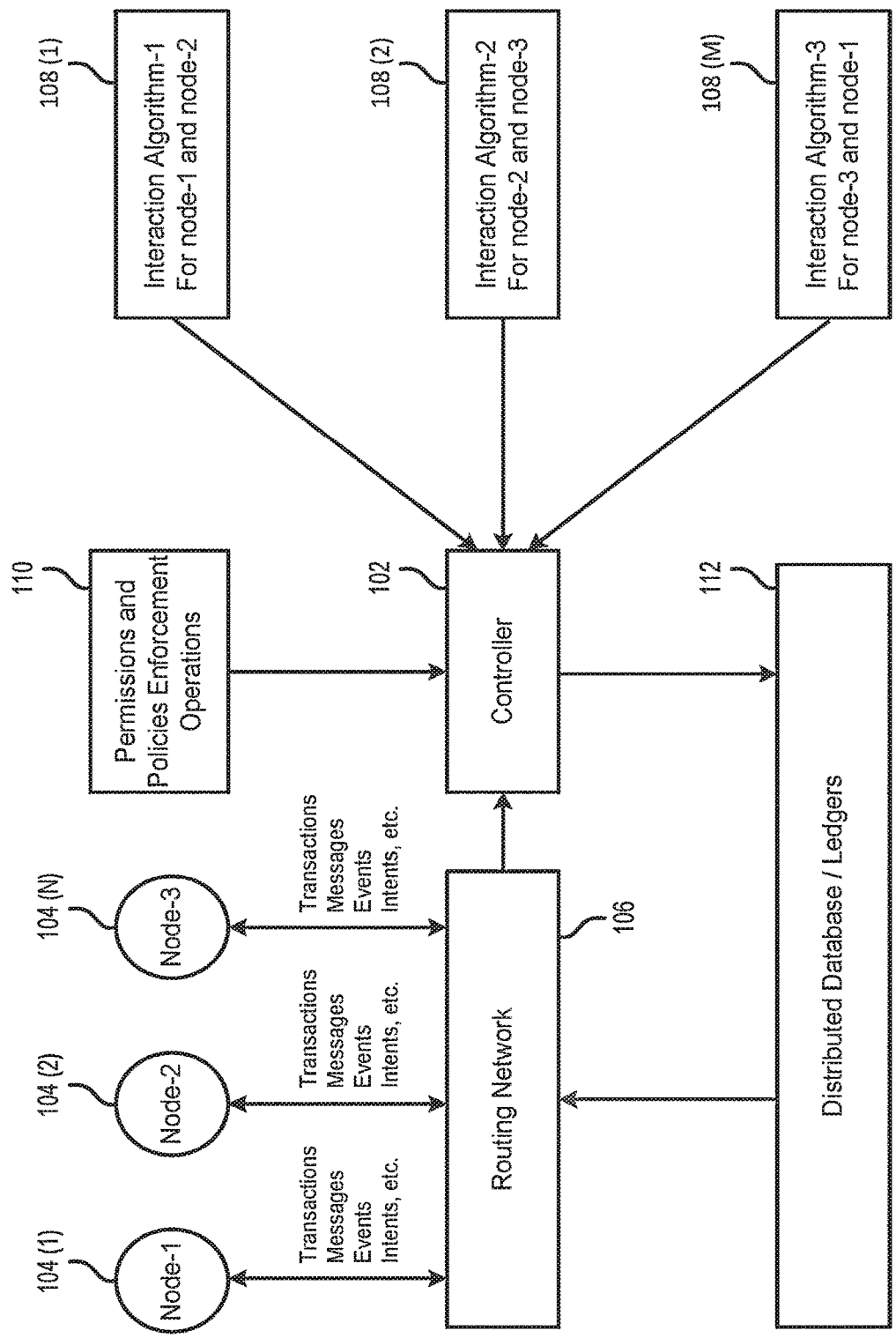
FIG. 1 depicts an example system for implementing at least some embodiments of the current disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

An "application" may be any set of computer-executable instructions configured to be executed by a processor in order to cause the processor to perform a function. An application may include computer code or other data stored on a computer readable medium (e.g. memory element or secure element) that may be executable by a processor to complete a task. An application may have multiple versions, some of which may be specific to types of hardware. For example, a mobile application may be an application configured to operate in conjunction with a mobile operating system and a processor installed within a mobile electronic device.

A "blockchain ledger" is a record of electronic transactions maintained according to a blockchain protocol. A full copy of a blockchain ledger may include every transaction ever executed by the system. Each entry (e.g., block) in the ledger may contain a hash of the previous entry. This has the effect of creating a chain of blocks from the genesis block to a current block. Each block is guaranteed to come after the previous block chronologically because the previous block's hash would otherwise not be known. Each block is also computationally impractical to modify once it has been in the chain for a while because every block after it would also have to be regenerated. These properties make a blockchain ledger relatively secure and tamper resistant.

A "blockchain provider" (also referred to as a "blockchain provider node") can be any computing device configured to provide blockchain functionality. The blockchain provider can include a single device, multiple devices, or one or more software modules configured to maintain aspects of a blockchain (e.g., one or more ledgers, etc.). In some examples, the blockchain provider may additionally provide routing functionality. Thus, in some embodiments, it is contemplated that blockchain and routing management functionality may be commonly performed by a blockchain provider.

A "blockchain router" (also referred to as a "blockchain routing node") can be any suitable computing device or software module that may be configured to perform routing functions utilizing a blockchain protocol. A blockchain routing node may be configured to transmit and receive data via a wired or wireless data network (e.g. 3G, 4G or similar networks), Wi-Fi, Wi-Max, or any other communication medium that may provide access to a network. A blockchain routing node may comprise any suitable hardware and software for performing routing functions, and may also include multiple devices or components (e.g., when a device has access to a network by tethering to another device—i.e. using the other device as a modem—both electronic devices taken together may be considered a blockchain routing node). A blockchain routing node may be configured to perform functions such as maintaining forwarding and/or routing tables, determining routing costs, selecting particular routes from many available routes, and facilitating or effectuating the routing of a data message to an intended destination. In some examples, the blockchain provider node may be configured to manage one or more blockchain ledgers. Thus, in some embodiments, it is contemplated that blockchain and routing management functionality may be commonly performed by a blockchain routing node.

A "centralized routing model" may refer to a routing model that is centrally effectuated using a centralized database (e.g., a single database maintained by a single entity). In other words, the routing table in a centralized routing model is stored at a single "central" node, which may be consulted when other nodes need to make a routing decision.

A "computing device" can be any suitable device or software module that is configured to process data. In some embodiments, a computing device may include communication capabilities such as using a mobile phone (wireless) network, wireless data network (e.g. 3G, 4G or similar networks), Wi-Fi, Wi-Max, or any other communication medium that may provide access to a network such as the Internet, an overlay network, or the like. Examples of computing devices include mobile phones (e.g. cellular phones), PDAs, tablet computers, net books, laptop computers, personal music players, hand-held specialized readers, server computers, etc. A computing device may comprise any suitable hardware and software for performing such functions, and may also include multiple devices or components (e.g. when a device has remote access to a network by tethering to another device—i.e. using the other device as a modem—both electronic devices taken together may be considered a single computing device).

A "decentralized network" is intended to refer to a network in which no one single computing device or software module has control over all of the processing of the network. A "centralized network" is intended to refer to a network in which a single computing device or node (or a relatively small number of the same) controls the processing of the network. Between the two, a decentralized network may be less likely to fail accidentally because it relies on many separate components that are not likely to fail at once. Additionally, decentralized systems are more expensive to attack and destroy or manipulate than centralized networks because decentralized networks lack sensitive central points that can be attacked at much lower cost than the economic size of the surrounding system. Additionally, it may be significantly more difficult for participants in a decentralized networks to collude to act in ways that benefit them at the expense of other participants.

A "distributed routing model" may refer to a routing model that is implemented using a distributed database, or in other words, a database for which a copy is distributed and maintained on many (or all) of the nodes/devices of a network.

An "extended blockchain protocol" may define message formats and message exchange rules for performing network routing functionality. The extended blockchain protocol may include functionality of a standard blockchain protocol that does not define network routing functionality.

A "forwarding table request message" is an example of a message defined by an extended blockchain protocol. In some embodiments, a forwarding table request message may be utilized to request forwarding table information from another computing device. In some embodiments, a forwarding table request message may be utilized to request an entire forwarding table from another computing device.

A "forwarding table response message" is an example of a message defined by an extended blockchain protocol. In some embodiments, a forwarding table response message may be utilized to provide forwarding table information to another computing device. In some embodiments, a forwarding table response message may be utilized to provide an entire forwarding table to another computing device.

"Forwarding table information" may include any suitable data associated with a forwarding table. For example, forwarding table information may include, but is not limited to, a destination, a next hop, and performance data (e.g., a metric and a cost) associated with a particular network route between two computing devices of a network.

A "messaging protocol" may be a set of rules for exchanging messages between two computing devices. In some cases, a messaging protocol may include conditions upon which actions are to be performed. In some embodiments, a message protocol may include a specification that defines a bitwise implementation for various message formats of the messaging protocol.

An "overlay network" may be a computer network that is built on top of another network. Nodes in an overlay network can be thought of as being connected by virtual or logical links, each of which corresponds to a path, perhaps through many physical links, in the underlying network. For example, distributed systems such as peer-to-peer networks and client-server applications are often overlay networks because their nodes run on top of the Internet. An overlay network, as discussed herein, may include one or more computing nodes (e.g., blockchain routing nodes, computing nodes for maintaining blockchain ledgers, etc.) for performing blockchain functionality including, but not limited to, managing one or more blockchain ledgers, determining routing costs, selecting particular routes from many available routes, and facilitating or effectuating the routing of a data message to an intended destination.

"Performance data" is intended to refer to metric and/or a cost associate with a network route. The metric may correspond to a latency value, a processing value quantifying processing costs, or the like. In some embodiments, the cost may correspond to a monetary cost associated with utilization of the network route.

A "routing table request message" is an example of a message defined by an extended blockchain protocol. In some embodiments, a routing table request message may be utilized to request routing table information from another computing device. In some embodiments, a routing table request message may be utilized to request an entire routing table from another computing device.

A "routing table response message" is an example of a message defined by an extended blockchain protocol. In some embodiments, a routing table response message may be utilized to provide routing table information to another computing device. In some embodiments, a routing table response message may be utilized to provide an entire routing table to another computing device.

"Routing table information" may include any suitable data associated with a routing table. For example, routing table information may include, but is not limited to, a destination, a next hop, and performance data (e.g., a metric and a cost) associated with a particular network route between two computing devices of a network.

A "routing table" may be a data table that lists available routes within a network, and in some cases, policies and/or metrics (distances) associated with those routes. A routing table contains information about the topology of the network to which it refers. The construction of routing tables is the primary goal of traditional routing protocols.

A "forwarding table" may include a subset of entries of a routing table. A forwarding table may include routes that have been determined to be optimal (e.g., based on policies, latency, cost, or other suitable measures) from multiple available routes.

A "peer-to-peer network" refers to a network that includes peer nodes/devices simultaneously acting as "clients" and "servers" to other nodes/devices in the network. The peer-to-peer network arrangement differs from the client-server model where communication is usually to and from a central server. Peer-to-peer networks may implement some form of virtual overlay network on top of the physical network topology, where the nodes in the virtual overlay form a subset of the nodes in the physical network. Data may still exchanged directly over the underlying protocol (e.g., TCP/IP) network, but at an application layer peers are able to communicate with each other directly, via the logical overlay links (each of which corresponds to a path through the underlying physical network).

A "peer discovery process" may refer to operations performed to discover other peers within a network. The peer discovery process may include any suitable operation for performing a task such as referring to a list of nodes from a previous connection to the network (e.g., a locally stored list), requesting and/or receiving a Domain Name Server (DNS) seed, or transmitting a request for identification to the network. In some embodiments, a DNS seed resolves to a list of IP addresses known to be running nodes. Additionally or alternative, the process may include referring to a static, hard-coded, locally-stored peer list in order to identify one or more peers of a network.

A "smart contract" may be an computer-executable instructions configured to cause a processor to enforce a policy or agreement. A smart contract may be used to represent an agreement between two or more parties, where the terms of the smart contract are recorded in a computer language as a set of instructions. Smart contracts may include a number of policies that must be enforced in order to complete a transaction between the two or more parties. A smart contract may be distributed across one or more nodes of a blockchain network, which may automatically execute the smart contracts.

Details of some embodiments of the present invention will now be described in greater detail.

FIG. 1 depicts an example system for implementing at least some embodiments of the current disclosure. Depicted in FIG. 1 is a controller 102 in communication with a number of nodes 104 (1-N) via a routing network 106. In accordance with at least some embodiments, the controller may be configured to receive interaction algorithm information 108 (1-M) from various data sources, generate policies based on that algorithm information 108 as well as permissions and policy enforcement operations 110, and distribute those policies in a distributed database/ledger 112.

A controller 102 may be any electronic computing device configured to distribute routing policies to a number of nodes 104 and/or distributed databases 112. In one illustrative configuration, the controller 102 may include at least one memory and one or more processing units (or processor(s)). The processor(s) may be implemented as appropriate in hardware, computer-executable instructions, firmware, or combinations thereof. Computer-executable instruction or firmware implementations of the processor(s) may include computer-executable or machine-executable instructions written in any suitable programming language to perform the various functions described.

The memory of controller 102 may individually store program instructions that are loadable and executable on the processor(s), as well as data generated during the execution of these programs. Depending on the configuration and type of user computing device, the memory may be volatile (such as random access memory (RAM)) and/or non-volatile (such as read-only memory (ROM), flash memory, etc.). The controller 102 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory may include multiple different types of memory, such as static random access memory (SRAM), dynamic random access memory (DRAM), or ROM.

Turning to the contents of the memory, the memory may include an operating system and one or more application programs, modules, or services for implementing the features described herein. Additionally, the memory may store configuration information such as, but not limited to, routing tables, forwarding tables, policy information, and the like. The routing network 106 may be an example of a centralized network in which routing is processed by a single node 104, or a subset of the nodes 104 (1-N) included in the routing network 106.

In some embodiments, the controller 102 may include a communication interface configured to enable communication between the controller 102 and another computing device (e.g., another computing device having access to the routing network 106). Examples of communication interface may include one or more radio frequency (RF) transceivers configured to send and receive communications using near-field communications (NFC), or other radio frequency or wireless communication protocols such as Bluetooth, Bluetooth low-energy (BLE), a wireless local area network (e.g., WiFi), iBeacon, etc. In some embodiments, communication interface may include an infrared communication device. In some embodiments, the communication interface may include both long range and short range communication means. For example, the communication interface may include an antenna configured to connect to a cellular network in order to enable communication with various other components of the depicted architecture. In some examples, the communication interface may utilize physical connections between computing devices of the routing network 106 to transmit and receive data.

A node 104 may be any electronic device configured to perform at least one primary function. In one illustrative configuration, the node 104 may include at least one memory and one or more processing units (or processor(s)). The processor(s) may be implemented as appropriate in hardware, computer-executable instructions, firmware, or combinations thereof. Computer-executable instruction or firmware implementations of the processor(s) may include computer-executable or machine-executable instructions written in any suitable programming language to perform the various functions described.

The memory of node 104 may individually store program instructions that are loadable and executable on the processor(s), as well as data generated during the execution of these programs. Depending on the configuration and type of computing device, the memory may be volatile (such as random access memory (RAM)) and/or non-volatile (such as read-only memory (ROM), flash memory, etc.). The node 104 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory may include multiple different types of memory, such as static random access memory (SRAM), dynamic random access memory (DRAM), or ROM.

Turning to the contents of the memory, the memory may include an operating system and one or more application programs, modules, or services for achieving some functionality. Additionally, the memory may store a copy of one or more database (e.g., one or more decentralized blockchain ledgers). The routing network 106 may be an example of a decentralized network in which blockchain ledger management is performed by each computing device (e.g., node 104) of the routing network 106. In some embodiments, each node 104 may represent a gateway to a separate blockchain network, such that the routing network 106 may represent an overlay network that manages traffic routed between the blockchain networks. Multiple nodes 104 may belong to a single blockchain network and may each represent points of ingress/egress. For example, a particular blockchain network may include multiple nodes at which traffic may enter/exit that blockchain network. These nodes 104 may be geographically distributed.

In some embodiments, the node 104 may include a communication interface configured to enable communication between the node 104 and another computing device (e.g., another node 104 included in the routing network 106). Examples of communication interface may include one or more radio frequency (RF) transceivers configured to send and receive communications using near-field communications (NFC), or other radio frequency or wireless communication protocols such as Bluetooth, Bluetooth low-energy (BLE), a wireless local area network (e.g., WiFi), iBeacon, etc. In some embodiments, communication interface may include an infrared communication device. In some embodiments, the communication interface may include both long range and short range communication means. For example, the communication interface may include an antenna configured to connect to a cellular network in order to enable communication with various other components of the depicted architecture. In some examples, the communication interface may utilize physical connections between computing devices of the routing network 106 to transmit and receive data.

Routing network 106 may include one or more computing devices configured to route communications between various nodes 104. In some embodiments, the computing devices may be the nodes 104. The routing network 106 may be an example of an overlay network that may include a variety of information and communication facilities, consisting of interconnected networks using a standard messaging protocol. By way of example, data may be transmitted between the computing devices of routing network 106 using a blockchain protocol in accordance with policies stored in the distributed database 112. In some examples, the computing devices of routing network 106 may be the same, or a subset, of the nodes 104 (1-N). However, in some cases, at least some of the nodes 104 (1-N) may not participate in the performance of routing functionality as described with respect to routing network 106.

The interaction algorithm information 108 may be any information defining interactions between two or more entities. In some embodiments, the interaction algorithm information 108 may be derived from a smart contract or other electronic document. The interaction algorithm information may be used to generate policies and may include information on rates to be enforced between entities, maximum/minimum traffic requirements, or any other suitable interaction conditions.

For simplicity of illustration, a certain number of computing devices are shown in FIG. 1. It is understood, however, that embodiments of the invention may include more than one of each computing device. In addition, some embodiments of the invention may include fewer than or greater than all of the computing device shown in FIG. 1.

Figure 2:
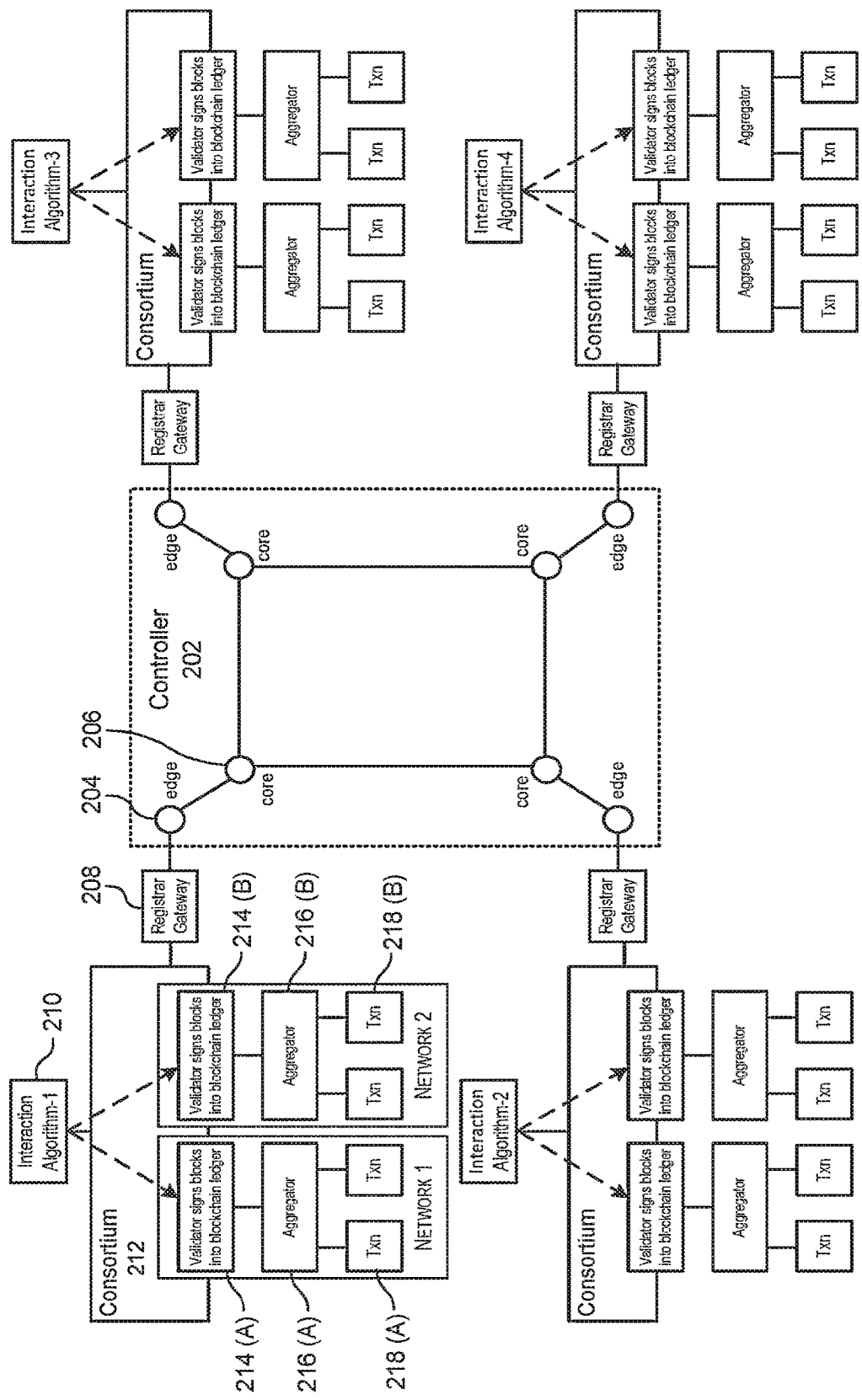
FIG. 2 depicts an example of an overlay network having a controller that may be configured to manage interactions between various blockchain networks in accordance with at least some embodiments.

FIG. 2 depicts an example of an overlay network having a controller that may be configured to manage interactions between various blockchain networks in accordance with at least some embodiments. In some embodiments, a controller 202 may route information within the overlay network. The overlay network may be a consortium or federated blockchain network in which a number of other blockchain networks participate. A federated network is one in which only authorized/enrolled participants may participate. A consortium network is a blockchain network in which the consensus process is controlled by a pre-selected set of nodes. For example, a consortium blockchain network may comprise a number of participant entities, each of which operates a node and of which at least a predetermined number must sign every block in order for the block to be valid. In a consortium blockchain, the right to read the blockchain may be public, or restricted to the participants. There may also be hybrid routes, such as the root hashes of the blocks being public together with an API, that enable non-members (e.g., the public) to make limited queries and obtain cryptographic proofs of some parts of the blockchain state. In some cases, consortium blockchain networks may be considered "partially decentralized".

The overlay network may include a number of edge nodes 204 and core nodes 206. A core node 206 is a computing device that forms the infrastructure of the overlay network. An edge node 204 is a computing device that serves as an interface between the overlay network (e.g., the consortium) and another blockchain network (e.g., a participant of the consortium). Accordingly, each edge node 204 may manage a registrar gateway 208 that connects to one or more blockchain networks. A registrar gateway may be one through which only network traffic associated with a registered entity (e.g., a consortium participant) may be routed. Although depicted as separate entities, each edge node and/or core node may perform the functions of the controller 202.

In some embodiments, the controller 202 of the overlay network may facilitate transactions between various blockchain networks (e.g., consortium participants) in accordance with policy information pertaining to those blockchain networks. For example, the controller 202 may facilitate a transaction between Network 1 and Network 2 using an interaction algorithm 210 specific to conducting transactions between those particular networks. The interaction algorithm 210 may be generated by parsing information from a smart contract or other policy document. For example, the controller 202 may receive a smart contract from each of the Network 1 and Network 2, which indicates one or more policies for completing transactions with that respective network (rates, formats, translation formulae, etc.). In another example, a smart contract may be provided which indicates how transactions should be handled with respect to specific networks (e.g., transactions between Network 1 and Network 2). Upon receiving these policies, the controller 202 may generate interaction algorithms from the policy documents, which may then be used to facilitate transactions. In some embodiments, the policies may include algorithms for translating data from a first format used by Network 1 to a second format used by Network 2.

In some embodiments, when the controller 202 facilitates a transaction between the two networks within the consortium 212, that transaction may be recorded into separate ledgers 214 (A and B) associated with each of the networks. In this scenario, the controller 202 may send the same information, or a subset of that information, to each of the networks with respect to the transaction, but that information may be formatted according to requirements of the network to which it is provided. Each of the networks may then aggregate the provided data using an aggregator 216 (A and B) and write the transaction 218 (A and B) to a blockchain ledger maintained by, and distributed across, the respective blockchain network. In this way, each respective blockchain network to a transaction may record the details of the transaction independently.

By way of illustration, consider a scenario in which an Entity 1 which operates Network 1 conducts a transaction with Entity 2 which operates Network 2. In this scenario, upon completion of the transaction between Entity 1 and Entity 2, ledgers maintained with respect to each of Network 1 and Network 2 may be updated independently to reflect the transaction. This may involve each of the ledgers being updated by their respective blockchain networks based on information provided to the networks. In some embodiments, the information provided to each of the networks may be formatted according to a data format specific to that network. For example, one or more of the interaction algorithms identified with respect to Network 1 and/or Network 2 may be a data formatting (e.g., a translation) algorithm used to communicate information to the respective network.

In some embodiments, the controller 202 may identify policies regarding conditions and/or costs associated with a particular blockchain network. For example, the controller 202 may identify (e.g., from a smart contract associated with at least one blockchain network) a service provided by the blockchain network, a cost of using the blockchain network, conditions under which the blockchain network may be used, or any other suitable policy to be enforced with respect to a blockchain network. Costs may be monetary costs or costs may refer to resource costs (e.g., latency, memory usage, etc.).

Blockchain networks within the consortium may each perform a number of available services. For example, some or all of the blockchain networks in the consortium may perform services related to trust management, fraud and disputes, underwriting (e.g., for credit lines), data routing, policy enforcement, member services, or any other suitable services. When a node of the overlay network acting as a controller receives an indication of a transaction to be processed using one or more services, the node may reference policies to determine which blockchain network(s) may be used to complete the transaction (e.g., based on which blockchain networks are associated with conditions that are met by the transaction). Additionally, policies may be referenced with respect to the entity that submitted the transaction. For example, the entity may be associated with a policy that indicates transactions should be conducted so that they minimize monetary costs. In another example, the entity may be associated with a policy that indicates transactions should be conducted so that the time to complete the transaction is minimized.

By way of illustrative example, a node may receive an indication to complete a particular transaction for Network 1. The controller 202, which may be a node of the overlay network, may determine that Network 2 and Network 3 are each able to complete the transaction. In this example, the controller 202 may determine that Network 1 is associated with a policy that dictates transactions conducted on behalf of Network 1 should be conducted such that monetary cost and latency are minimized. In this example, the controller 202 may determine that Network 2 is associated with a policy that it charges $2 for this particular type of transaction. The controller 202 may also determine that Network 3 is associated with a policy that it charges $3 for this particular type of transaction. The controller 202 may also query a metrics database associated with each of Networks 2 and 3 in order to identify a latency for each of those networks. For this example, assume that the latency for each of the networks is the same. In that event, the controller would select Network 2 to complete the transaction in order to minimize monetary cost. Upon determining that Network 2 is to be used, the controller 202 may identify one or more policies applicable to the transaction. In this example, the one or more policies may be specific to transactions conducted between Network 1 and Network 2, transactions conducted with Network 2, and transactions conducted on behalf of Network 1. Once each of the applicable policies have been identified, the controller 202 may identify some interaction algorithm 210 that should be used to complete the transaction. In some embodiments, the interaction algorithm 210 may include instructions for converting information from a first format used by Network 1 into a second formation used by Network 2. The controller 2 may then facilitate the transaction by routing information between the two networks in accordance with the interaction algorithm 210. Each of the networks may separately record the transaction in its respective ledger.

In some embodiments, because each separate blockchain retains details of the transaction within its respective ledger, the controller 202 may provide virtualization with zero knowledge proof. Zero knowledge proof is a method by which one party (a prover) can prove to another party (a verifier) that a given statement is true, without conveying any information apart from the fact that the statement is indeed true. In particular, the controller 202 is able to provide non-interactive zero knowledge proof since a common reference string is shared between the prover and the verifier (where each of the prover and the verifier are separate blockchain networks), which is enough to achieve computational zero-knowledge without requiring interaction.

Figure 3:
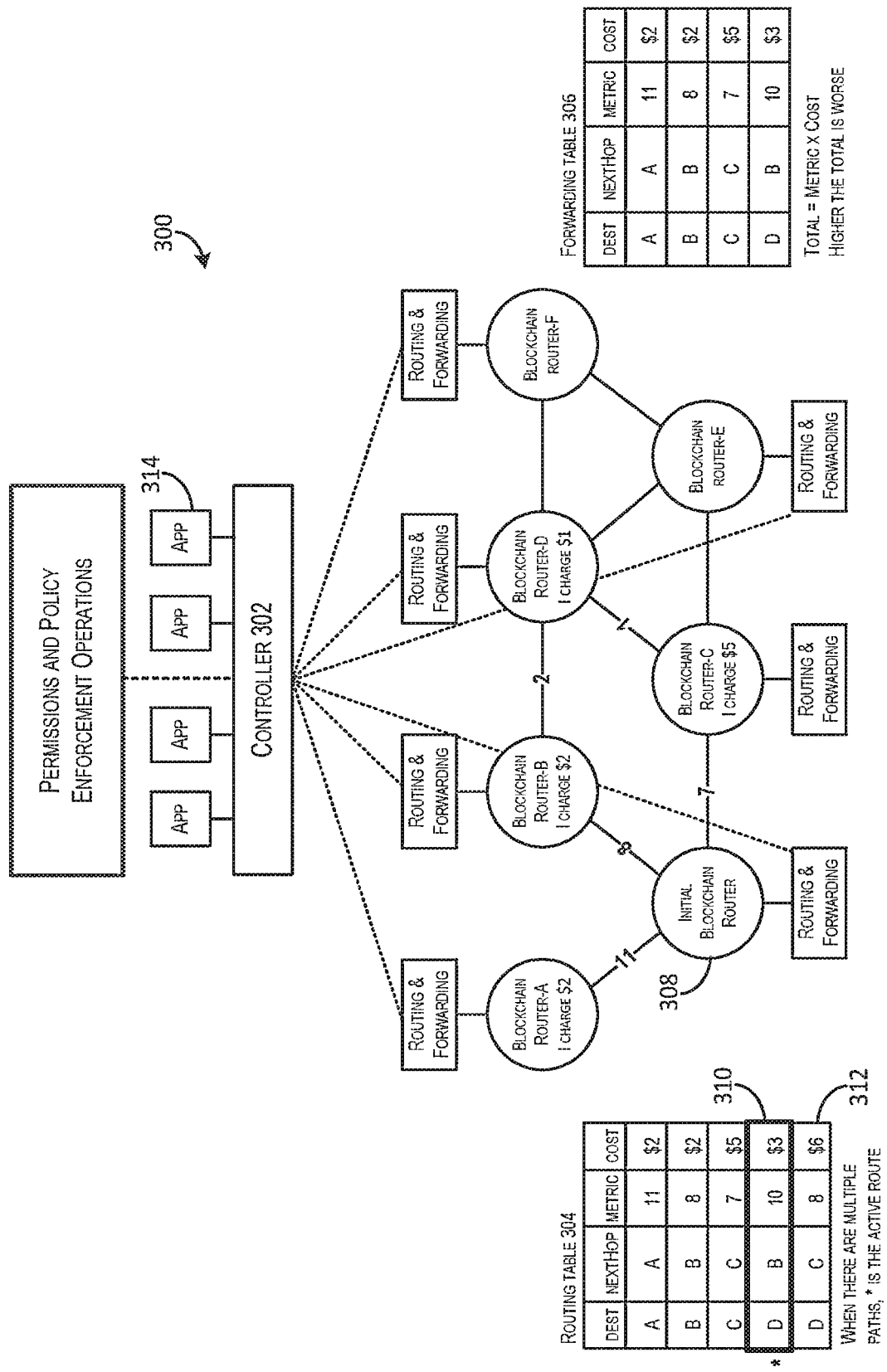
FIG. 3 depicts an example of policy enforcement within a network of blockchain routers for implementing secure blockchain routing protocols in accordance with at least some embodiments.

FIG. 3 depicts an example of policy enforcement within a network 300 of blockchain routers for implementing secure blockchain routing protocols in accordance with at least some embodiments. The network may include any suitable number of blockchain routers (e.g., blockchain routers A-F). One or more of the blockchain routers may perform the functions of a controller 302 described herein. The blockchain routers A-F of FIG. 2 are intended to be examples of the nodes 104 of FIG. 1 participating in an overlay network (e.g., the routing network 106 of FIG. 1). Accordingly, the blockchain routers may individually be a device or software module configured to perform the routing functionality described herein and corresponding to the controller 302. In some examples, such functionality may be performed by an application operating on one or more of the blockchain routers of FIG. 2. In some embodiments, the blockchain routers may individually be a device or software module configured to perform blockchain ledger management. In these examples, such functionality may be performed by an application operating on one or more of the blockchain routers of FIG. 2. Although a particular number of blockchain routers are depicted in FIG. 2, it should be appreciated that any suitable number of blockchain routers may be utilized. Some examples of methods using blockchain routers for implementing secure blockchain routing protocols can be found in International Pat. App. No. PCT/US2017/032762 to Wang, filed on May 15, 2017, which is herein incorporated by reference in its entirety.

In some embodiments, controller 302 may be configured to generate and maintain a routing table (e.g., the routing table 304) for the network 300. Routing table 304 is intended to depict an example routing table for the network 300. Routing table 304 may include more or fewer entries then those depicted in FIG. 2. Each entry in routing table 304 may include a suitable combination of a destination (e.g., an Internet Protocol (IP) address of a destination), a next hop address (e.g., an IP address of a next hop), a metric (depicting a processing cost, distance, latency, or the like), and a monetary cost. The routing table 304 may be viewed as a set of policies, in this case formatted in table format, that is used to determine where data packets traveling over the network 300 will be directed. The controller 302 may be configured to generate the routing table 304 from one or more data messages received from one or more of the blockchain routers of the network 300. Such data messages may be formatted according to an extended blockchain protocol that defines message formats and message exchange rules for performing the functionality of controller 302. The extended blockchain protocol utilized may include functionality of a standard blockchain protocol that does not define routing capabilities/functionality. In some embodiments, the routing table 304 may be generated based on policies obtained from one or more smart contracts received by the controller 302. For example, upon receiving a smart contract related to interactions between Blockchain Router A and Blockchain Router B, the controller may, in accordance with permissions and policy enforcement operations, be configured to update information in the routing table 304 and/or a forwarding table 306 based on that information.

The controller 302 may additionally be configured to generate forwarding table 306 from the routing table 304. The forwarding table 306 may include some subset of the routes contained in the routing table 304. In some examples, the entries of the forwarding table 306 may include the most optimal routes determined from the routing table 304. For example, the forwarding table 306 may include a single optimal route between any pair of blockchain routers that constitutes the lowest total cost. In some examples, the optimal route may be one that has a lowest total value as determined by multiplying a corresponding metric by a corresponding monetary cost in accordance with various policies.

By way of example, with respect to an initial blockchain router 308, the routing table 304 indicates that there are two routes to destination D (e.g., route 310 and route 312). Accordingly, the controller 302 may be configured to calculate a total cost for route 310 (e.g., 10×$3=$30) and a total cost for the route 312 (e.g., 8×$6=$48). In this non-limiting example, the controller 302 may be configured to determine that route 312 is the most-optimal route to utilize based on route 312 being associated with the lowest calculated value. Accordingly, the controller 302 may include route 312 and exclude route 310 from the forwarding table 306. In some embodiments, the controller 302 may be configured to communicate one or more forwarding tables (e.g., the forwarding table 306) to one or more blockchain routers (or another suitable computing device) in the network 300.

In some embodiments, the controller 302 may be configured to facilitate data message routing within the network 300. The controller 302 may be configured to transmit and receive data messages formatted according to an extended blockchain protocol in order to transmit data message through the network 300 according to the routing table 304 and/or the forwarding table 306.

In some embodiments, the controller 302 may be configured to maintain one or more blockchain ledgers. By way of example, the controller 302 may maintain a blockchain ledger of the routing table 304 and/or the forwarding table 306. By maintaining the blockchain ledger(s), routing table 304 and/or forwarding table 306 may be made tamper resistant. By way of example, each update of the routing table 304 may be stored as a transaction in a blockchain ledger where each entry of the blockchain ledger contains the current routing table as well as a hash of the previous entries in the blockchain ledger corresponding to previous versions of the routing table. In another example, as the controller receives policy information related to two or more blockchain routers, the controller 302 may initiate a transaction to record those policies. The ledger may then be used to identify current policies for a pair of blockchain routers by identifying the latest transactions in the ledger with respect to those blockchain routers. Accordingly, the blockchain ledger may be utilized to ensure that the routing table 304 has not been tampered with. Similarly, the controller 302 may be configured to maintain one or more blockchain ledgers for the forwarding table 306 (or any forwarding table) to ensure that the forwarding table 306 has not been tampered with. In this example, the controller 302 may receive a smart contract relating to two or more of the blockchain routers in the network 300. In this example, the controller may parse the content of the smart contract and derive one or more policies to be applied to transactions between those blockchain routers. The controller 302 may then update a routing table within a blockchain ledger to reflect those values associated with the derived policies. The blockchain ledger may then be signed and distributed to a number of network nodes (e.g., blockchain routers).

In some embodiments, the network 300 may depict a centralized network in which a single computing device (e.g., the blockchain router B) may perform the functions of the controller 302. It may be the case in some embodiments that the generation and maintenance of the routing table 304 and/or the forwarding table 306 is performed by the controller 302 and distributed across some or all of the blockchain routers of the network 300. In other examples, the network 300 may depict a decentralized network in which any/each of the blockchain routers may perform the functions of the controller 302.

In some embodiments, tasks may be submitted by applications (e.g., application 314. The tasks submitted may be any suitable task requiring routing between two computing devices. The controller 302 may be configured to consult permissions and policy enforcement operations as well as the forwarding table 306 to determine a next hop address for a data packet corresponding to the submitted task. The forwarding table 306, in some examples, may be associated with a current blockchain router at which the data packet was most recently received. The controller 302 may be configured to cause the data packet to be transmitted to the identified next hop address. This process may be repeated any suitable number of times until the data packet arrives at the intended destination.

Figure 4:
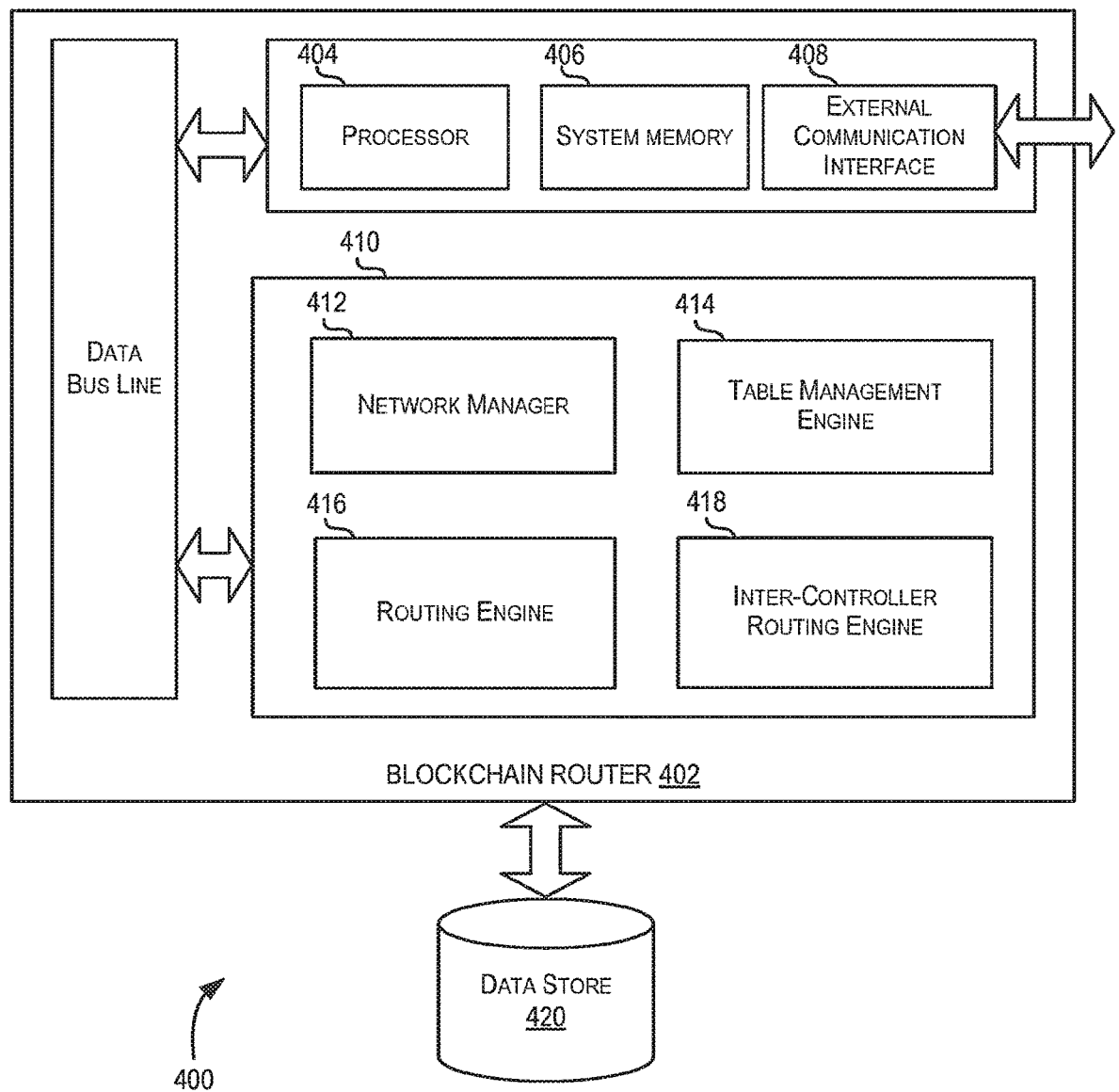
FIG. 4 depicts an illustrative example computer architecture of a blockchain router configured to implement secure blockchain routing protocols in accordance with at least some embodiments.

FIG. 4 depicts an illustrative example computer architecture 400 of a blockchain router 402 (e.g., the blockchain routers of FIG. 3) configured to implement secure blockchain routing protocols in accordance with at least some embodiments. As discussed above, the blockchain router 402 may perform any suitable combination of the routing functionality of the controller 302 of FIG. 3. The routing functionality may be executed by an application stored in the computer readable medium 410 and operating on the blockchain router 402.

In some embodiments, the blockchain router 402 may comprise a processor 404, which may be coupled to a system memory 406 and an external communication interface 408. A computer readable medium 410 may also be operatively coupled to the processor 404. The computer readable medium 410 may comprise any suitable combination of software modules including a network manager 412, a table management engine 414, a routing engine 416, and an inter-controller routing engine 418. The modules of the blockchain router 402 may be software and/or hardware modules. It should be appreciated that any functionality described with respect to the modules of FIG. 4 may be combined to be performed by a single module or may be performed by a module that is external to the blockchain router 402.

The network manager 412, a component of the blockchain router 402, may be configured to cause the processor 404 to execute operations for joining a network (e.g., the network 106 of FIG. 1, an example of an overlay network for performing blockchain routing functionality). Such operations may include transmitting and receiving data messages corresponding to requests/response to join the network. The network manager 412 may be configured to cause the processor 404 to execute operations to discover peers within a network (e.g., the network 106).

In some embodiments, the table management engine 414, a component of the blockchain router 402, may be configured to cause the processor 404 to execute operations for maintaining one or more routing tables (e.g., the routing table 316 of FIG. 3) and/or one or more forwarding tables (e.g., the forwarding table 306 of FIG. 3 and/or the forwarding table 318 of FIG. 3). Such operations may include transmitting and receiving data messages to/from other blockchain routers (or other computing devices of the network) corresponding to requests/response for routing information. The routing information received by the table management engine 414 may specify particular routes known by a particular blockchain router and/or suitable computing device of the network. The route information may include a destination, next hop, metric, and monetary cost associated with each route known to the device. It should be appreciated that the routing information may contain any suitable information associated with a route.

In some embodiments, the routes may be generated from smaller routes recursively generated based on the policies. For example, consider a scenario in which a message needs to be routed from the initial blockchain router 308 to blockchain router F. Blockchain routers D and E may each determine that they are in direct communication with Blockchain router F. Accordingly, each may identify the direct path as the most appropriate path. Blockchain routers B and C may then determine that they are in direct communication with at least one of Blockchain routers D and E. Blockchain router B may determine a cost associated with routing the message from B→D→F, since that is the only appropriate path. However, Blockchain router C may calculate costs associated with the routes C→D→F and C→E→F, which are both available. Based on the policy data, Blockchain router C may identify a route of the two identified routes which most closely matches policies set forth by the message sender (e.g., minimize monetary cost, etc.). In this example, the Blockchain router C may determine that the C→D→F route will result in a monetary cost of $3 and the C→E→F route will result in a monetary cost of $5. Blockchain router C may then provide an indication to the initial blockchain router that the cost of the route is $3. The initial blockchain router may also receive an indication from the Blockchain router B that indicates a cost of $6. Based on this, the initial blockchain router 308 may generate a route that includes Initial→C→E→F.

In some embodiments, the table management engine 414 may be configured to cause the processor 404 to calculate a total cost associated with each route. As described above a total cost may be calculated by the table management engine 414 multiplying a metric by a monetary cost associated with the route, although other suitable methods for calculating a total cost may be utilized. After calculating the total cost for each route, the table management engine 414 may be configured to construct one or more forwarding tables (e.g., the forwarding table 306 of FIG. 3). In some embodiments, the table management engine 414 may be configured to provide the generated routing table(s) and/or forwarding table(s) to one or more other blockchain routers.

In some embodiments, the table management engine 414 may be configured to cause the processor 404 to store any suitable combination of one or more routing tables and/or one or more forwarding tables that the table management engine maintains. By way of example, the table management engine 414 may be configured to store such routing/forwarding tables in data store 420, a storage location configured to store such information. The data store 420 may exist as part of the memory 410 that is local to the blockchain router 402 and/or the data store 420 may be accessible to the processor 404 but exist external to the blockchain router 402.

In some embodiments, the routing engine 416, a component of the blockchain router 402, may be configured to cause the processor 404 to execute operations for transmitting a data message according to a routing table (e.g., the routing table 304 of FIG. 3) and/or one or more forwarding tables (e.g., the forwarding table 306 of FIG. 3). The routing engine 416 may be configured to modify the data message in any suitable manner in order to transmit the data message to the appropriate destination. By way of example, the routing engine 416 may be configured to cause the processor 404 to modify an address field of the message in order to direct the data message to the appropriate next hop address. Generally, the routing engine 416 may be configured to cause the processor to perform any suitable operations corresponding to a routing controller (e.g., the controller 302 of FIG. 3).

In some embodiments, the inter-controller routing engine 418, a component of the blockchain router 402, may be configured to cause the processor 404 to execute operations for transmitting a data message according to a routing table (e.g., the routing table 316 of FIG. 3) and/or one or more forwarding tables (e.g., the forwarding table 318 of FIG. 3). The inter-controller routing engine 418 may be configured to cause the processor 404 to modify the data message in any suitable manner in order to transmit the data message to the appropriate destination. By way of example, the inter-controller routing engine 418 may be configured to cause the processor 404 to modify an address field of the message in order to direct the data message to the appropriate next hop address. Generally, the inter-controller routing engine 418 may be configured to cause the processor to perform any suitable operations corresponding to an inter-network routing controller (e.g., the controller 302 of FIG. 3).

Figure 5:
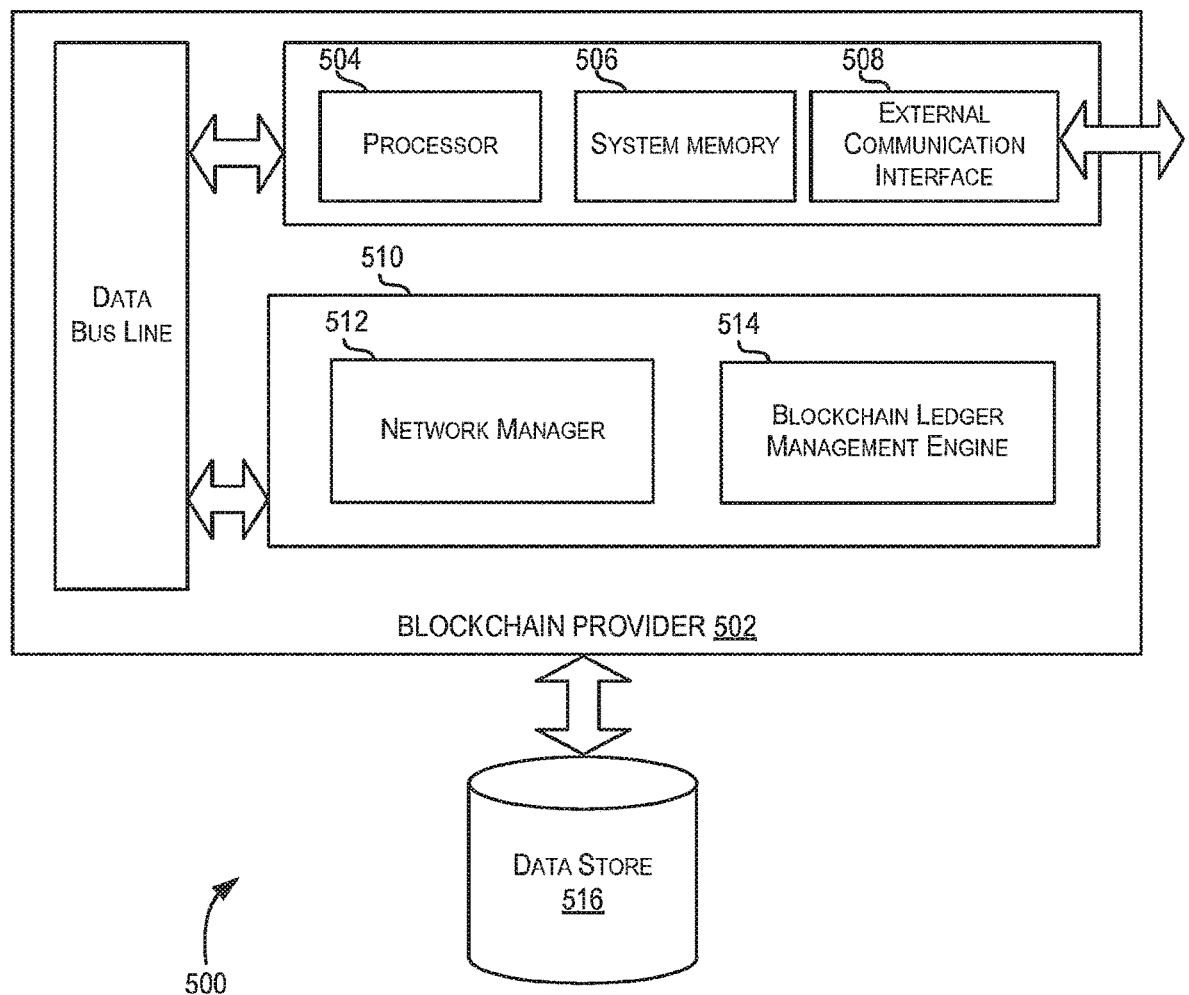
FIG. 5 depicts an illustrative example computer architecture of a blockchain provider configured to maintain one or more blockchain ledgers in accordance with at least some embodiments.

FIG. 5 depicts an illustrative example computer architecture 500 of a blockchain provider 502 configured to maintain one or more blockchain ledgers in accordance with at least some embodiments. A blockchain provider 502 can be configured to maintain aspects of a blockchain (e.g., one or more ledgers, etc.). It is contemplated that, in some embodiments, at least a portion of the functionality of the blockchain provider 502 may be included as a module of the blockchain router 402 of FIG. 4.

In some embodiments, the blockchain provider 502 may comprise a processor 504, which may be coupled to a system memory 506 and an external communication interface 508. A computer readable medium 510 may also be operatively coupled to the processor 504. The computer readable medium 510 may comprise any suitable combination of software modules including a network manager 512 and a blockchain ledger management engine 514. The modules of the blockchain provider 502 may be software and/or hardware modules. It should be appreciated that any functionality described with respect to the modules of FIG. 5 may be combined to be performed by a single module or may be performed by a module that is external to the blockchain provider 502.

The network manager 512, which may be a component of the blockchain provider 502, may be configured to cause the processor 504 to execute operations for joining a network (e.g., the routing network 106 of FIG. 1, an example overlay network for maintaining one or more blockchain ledgers). Such operations may include transmitting and receiving data messages corresponding to traditional blockchain transactions. The network manager 512 may be configured to cause the processor 504 to execute operations to discover peers within a network (e.g., the routing network 106). Such operations may conform to traditional technique for peer discovery within a blockchain network (e.g., the routing network 106).

In some embodiments, the blockchain ledger management engine 514, a component of the blockchain provider 502, may be configured to cause the processor 504 to execute operations for maintaining one or more blockchain ledgers. As described above, a "blockchain ledger" is a record of electronic transactions maintained according to a blockchain protocol. A full copy of a blockchain ledger may include every transaction ever executed within a blockchain network (e.g., the routing network 106 of FIG. 1). Each entry (e.g., block) in the ledger may contain a hash of the previous entry. This has the effect of creating a chain of blocks from the genesis block to a current block. Each block is guaranteed to come after the previous block chronologically because the previous block's hash would otherwise not be known. Each block is also computationally impractical to modify once it has been in the chain for a while because every block after it would also have to be regenerated. These properties make a blockchain ledger relatively secure and tamper resistant.

In some embodiments, when the functionality of the blockchain provider 502 is accessed or performed by the blockchain router 402 of FIG. 4, one or more routing tables and/or one or more forwarding tables may be maintained as a single, or separate blockchain ledgers. Accordingly, routing/forwarding tables corresponding to a routing controller may be stored as a blockchain ledger. Similarly, routing/forwarding table corresponding to an inter-network routing controller may be stored as a blockchain ledger.

In some embodiments, the blockchain ledger management engine 514 may be configured to cause the processor 504 to store any suitable combination of one or more blockchain ledgers. By way of example, the blockchain ledger management engine 514 may be configured to store a blockchain ledger in data store 516, a storage location configured to store such information. The data store 516 may exist as part of the memory 510 that is local to the blockchain provider 502 or the data store 516 may be accessible to the processor 504 but exist external to the blockchain provider 502.

In some embodiments, the blockchain ledger management engine 514, may be configured to cause the processor 504 to execute operations for transmitting/receiving data messages between blockchain providers of a distributed blockchain. A distributed blockchain can include any suitable number of blockchain providers collectively responsible for maintaining one or more blockchain ledgers.

Figure 6:
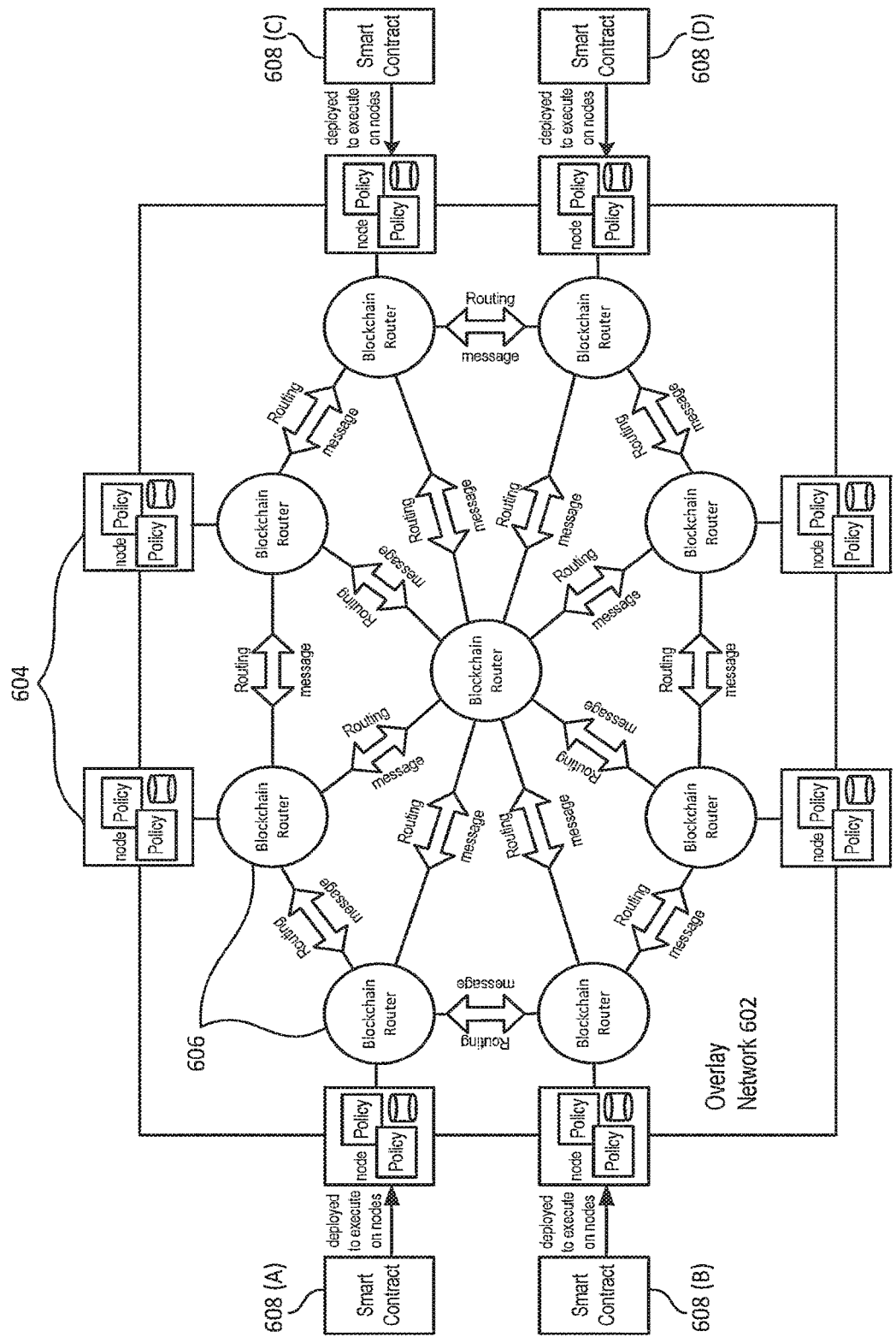
FIG. 6 depicts an example overlay network that may be implemented in accordance with at least some embodiments.

FIG. 6 depicts an example overlay network that may be implemented in accordance with at least some embodiments. In FIG. 6, an overlay network 602 is depicted as including a number of nodes 604. Some of the nodes 604 may be blockchain routers 606, which serve as ingress/egress points to various network participants. In at least some embodiments, each of the nodes of the overlay network may act as a controller as described herein. The overlay network 602 may be a consortium (or federated) blockchain network in which only member entities may participate.

In some embodiments, policy data may be stored in a blockchain ledger associated with the overlay network. For example, as new policies are identified with respect to the overlay network and its participants, information related to those policies may be written to the policy ledger, which may then be distributed to participants of the overlay network. It should be noted that policy information distributed throughout the overlay network in this manner may be made permanent by virtue of being included in a blockchain ledger format. Hence, a policy that pertains to particular participants may be associated with multiple transactions. In some embodiments, the policy data may be stored in database tables (e.g., the routing table 304 or the forwarding table 306 of FIG. 3), which may be distributed to each of the participants of the overlay network.

In at least some embodiments, one or more policy documents 608 (A-D) (e.g., smart contracts) may be provided to various nodes 604 of the overlay network 602 (e.g., by network participants). The policy documents 608 may pertain to specific network participants and/or specific transaction types. In some cases, the policy document may pertain to transactions conducted between two particular network participants, transactions conducted on behalf of a particular network participant, or transactions conducted by a particular network participant. Upon receiving one of these policy documents 608, the node 604 may parse the policy document 608 to identify the policies within that document. Each policy may be used by the node 604 to generate one or more interaction algorithms, which may be used to govern interactions between network participants. For example, a first policy may indicate a first specific data format utilized by a first network participant and a second policy may indicate a second specific data format utilized by a second network participant. In this example, the policy data may be updated to include a translation algorithm that translates data from the first format to the second format and vice versa. In some embodiments, the overlay network may maintain a standard data format that is used by the overlay network. In these embodiments, a first interaction algorithm may be used to translate information between the first specific data format and the standard data format and a second interaction algorithm may be used to translate information between the second specific data format and the standard data format. In this way, the controller may translate between the first specific data format and the second specific data format by using the standard data format as an intermediary data format.

In some embodiments, data may be routed within the overlay network based on algorithms for routing data included in the policies. For example, one or more blockchain networks may be accessed via each of the blockchain routers. In order to reach a particular network address, a message may be transmitted between a number of these blockchain routers. In some embodiments, the policies may indicate costs (e.g., monetary costs and/or resource costs) and/or constraints (e.g., the kinds of data that may be routed) associated with using particular blockchain routers 606 of the overlay network. A controller of the overlay network, which may implemented on one of the blockchain routers 606, may identify a routing path based on the stored policy data. In some embodiments, the controller may identify a policy associated with the entity that requested routing of the message to determine how a message should be routed (e.g., what constraints should be implemented, what costs should be minimized, etc.). For example, the controller may identify a policy associated with the entity that submitted the message that indicates a routing path for a message should be identified so that a particular cost (e.g., a monetary cost) is minimized. In this example, the controller may identify a number of available routes for the message and may identify an optimal route from those identified based on that route having the minimum cost of the available routes. In some embodiments, the entity may have a not-to-exceed constraint which dictates that the message is not to be routed unless the controller is able to identify a route for which a cost is not to exceed a predetermined value.

In some embodiments, the overlay network may maintain policies in relation to particular types of tasks that may be performed. For example, the overlay network may be used to perform tasks related to asset management, resolving fraud disputes, auditing and policy enforcement, trust management, underwriting, registration (e.g., enrollment), validation/aggregation, or any other suitable service. The controller, upon receiving requests to complete tasks using participants of the overlay system, may determine which participants are in compliance with the policies maintained by the controller. In some embodiments, each part of the completion of a transaction may be governed by a different set of policies.

By way of illustrative example, a first Entity A may submit a request to complete a transaction related to trust management services. In this example, the controller may determine that Entity B is able to complete the requested transaction. To facilitate a transaction between the two Entities A and B, the controller may identify policies associated with each of them. For example, the controller may determine that Entity A requires that each of its transactions be performed using specific security protocols. In this example, the controller may determine that Entity B does use the required security protocols. Additionally, the controller may determine a cost of the transaction to Entity A for Entity B to complete the transaction. The controller may then determine whether the cost is within an acceptable range governed by the policies associated with Entity A.

Continuing with the example above, each of Entity A and B may maintain a separate blockchain network having its own operational protocols. Upon determining that the transaction requested by Entity A may be completed by Entity B, the controller may identify interaction algorithms within the policy data that may be used to translate data between a Format A used by Entity A and a Format B used by Entity B and vice versa. In some embodiments, this may involve a direct translation between the two formats. In some embodiments, this may involve a translation to an intermediary format (e.g., a standard format used by the overlay network). In this way, the blockchain networks associated with both Entity A and Entity B each receive data in the format that it requires. In some embodiments, each of Entity A and Entity B may record the transaction to its own ledger.

Figure 7:
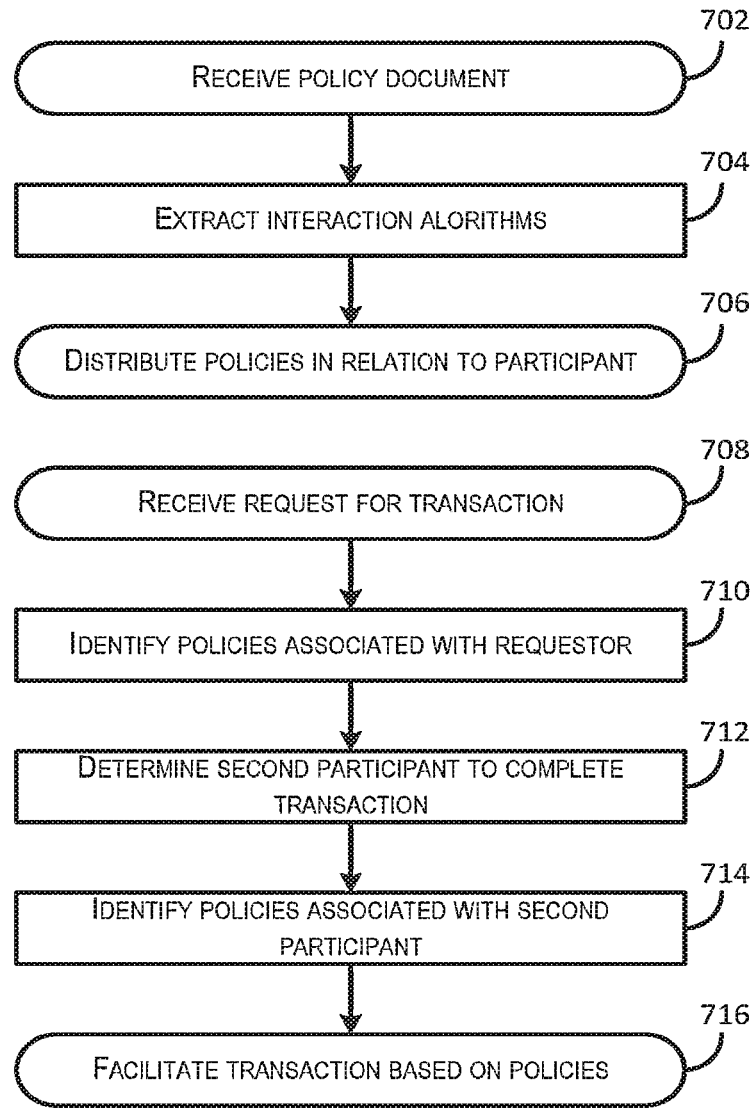
FIG. 7 depicts a flow diagram illustrating a process for enabling interaction between network participants via policy enforcement in accordance with at least some embodiments.

FIG. 7 depicts a flow diagram illustrating a process 700 for enabling interaction between network participants via policy enforcement in accordance with at least some embodiments. Some or all of any of the processes described herein (or variations and/or combinations thereof) may be performed under the control of one or more computer systems configured with executable instructions and may be implemented as code (e.g., executable instructions, one or more computer programs or one or more applications). In accordance with at least one embodiment, the process 700 of FIG. 7 may be performed by at least the controller 202 of FIG. 2, or a blockchain router 402 of FIG. 4. The code may be stored on a computer-readable storage medium, for example, in the form of a computer program including a plurality of instructions executable by one or more processors. The computer-readable storage medium may be non-transitory.

The process 700 may begin at 702, when a policy document is received by the controller. In some embodiments, the policy document may be a smart contract or other electronic document having computer executable instructions. In some embodiments, policy information may be provided by an administrator. The controller may receive policy documents related to multiple participants of a consortium.

At 704, the controller may extract one or more interaction algorithms from the policy document. In some embodiments, the policy documents may include computer executable instructions to be implemented with respect to a particular overlay network participant. At 706, the controller may distribute the interaction algorithms within policy data based on those computer executable instructions.

At 708, the controller may receive a request to complete a transaction. The requested transaction may include an indication of a particular type of transaction that the request is directed to. In some embodiments, the request for a transaction may include an indication of a network entity to complete the transaction. For example, the request for the transaction may indicate the entity with which the requestor wishes to complete a transaction and the type of transaction to be completed. In some embodiments, the requested transaction may relate to asset management, resolving fraud disputes, auditing and policy enforcement, trust management, underwriting, registration (e.g., enrollment), validation/aggregation, or any other suitable service.

At 710, the controller may identify policies associated with the requestor from which the request was received. For example, the request may include an indication as to the requestor's identity. In some embodiments, the requestor may be identified based on an address (e.g., an internet protocol (IP) address) from which the request originated. Upon identifying the requestor, the controller may query the policy data to identify a set of policies which pertains to that requestor. The policies may include constraints related the requested transaction. In another example, the controller may identify a format used by the identified requestor.

At 712, the controller may determine a second participant of the overlay network which is appropriate for completing the requested transaction. This determination by the controller may be made based on the policies identified with respect to the requestor. For example, the controller may determine which entities are capable of providing a service associated with the request in accordance with the constraints identified with respect to the requestor. In some embodiments, this may involve determining which entity is capable of performing the requested service in a way that optimizes or reduces one or more costs.

At 714, the controller may identify policies associated with the determined second entity. For example, the controller may identify one or more costs, protocols, and/or routing requirements associated with performing the requested transaction with the identified entity. In another example, the controller may identify a format used by the identified entity within a blockchain network that it operates. In some embodiments, the policies associated with the entity to complete the transaction and/or the requestor may include an indication as to access rights that various network participants may have with respect to data in a blockchain network. In some embodiments, the policies may include write permissions that various network participants may have with respect to data in a blockchain network. In some embodiments, at least one of the sets of policies associated with the two entities may indicate which parties may interact with the entity (e.g., use a blockchain network associated with the entity).

At 716, the controller may facilitate the completion of the transaction between the two overlay network participants. This facilitation by the controller may involve the use of both the policies identified with respect to the requestor and policies identified with respect to the second participant. For example, the controller may identify a first data file format used by the requestor from a set of policies associated with the requestor and a second data file format used by the entity identified to complete the transaction from a set of policies associated with that entity. In this example, the controller may translate data from the first format into the second format in accordance with the policies and vice versa.

Embodiments of the invention provide for a number of technical advantages. For example, embodiments of the invention enable interaction between various blockchain networks through enforcement of policies. Conventional systems are typically unable to reach consensus between two entities having different policies. Accordingly, the techniques described herein provide an overlay network that provides policy enforcement of transactions, wherein the policies to be enforced via the overlay network are maintained by some or all of the overlay network participants. This relieves the participants from the need to utilize a centralized network, such as the Internet, for interaction while providing a technique for reaching consensus. Accordingly, the privacy of the data being exchanged may be guarded to a greater extent than is possible using the standard message protocols utilized by the Internet while enforcing rights and policies relevant to the participants of the system.

Additionally, in some embodiments, the techniques provided herein enable monetization of network routing and such monetary costs may be utilized to perform routing/functionality decisions. Such costs may be collected via traditional billing/payment procedures. Policies maintained with respect to each participant allow those participants to outline what costs may be incurred from the use of any particular service while also indicating which services should be used.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A computer-implemented method, comprising:
   receiving by a controller, from a first entity associated with a first blockchain network, a request to conduct a transaction between the first entity and a second entity, the second entity associated with a second blockchain network;
   identifying a first set of policies associated with the first blockchain network by parsing a first smart contract associated with the first blockchain network, wherein the first set of policies comprises a first interaction algorithm and a first set of security protocols;
   identifying a second set of policies associated the second blockchain network by parsing a second smart contract associated with the second blockchain network, wherein the second set of policies comprises a second interaction algorithm and a second set of security protocols, wherein the first set of security protocols and the second set of security protocols ensure that the transaction is secure;
   generating, by the controller, another interaction algorithm based on the first set of policies and the second set of policies; and
   facilitating, by the controller, the transaction between the first entity and the second entity using the first set of security protocols and the second set of security protocols, and by at least formatting, using the another interaction algorithm, a first message with information regarding the transaction in a first data format compatible with the first blockchain network and transmitting the first message to the first blockchain network, and formatting, using the another interaction algorithm, a second message with information regarding the transaction in a second data format compatible with the second blockchain network and different than the first data format, and transmitting the second message to the second blockchain network, wherein responsive to receiving the first message, the first blockchain network records the transaction on the first blockchain network, and responsive to receiving the second message, the second blockchain network records the transaction on the second blockchain network.

2. The computer-implemented method of claim 1, wherein at least one of the first set of policies or the second set of policies indicates whether the first entity and the second entity may interact.

3. The computer-implemented method of claim 1, wherein at least one of the first set of policies or the second set of policies indicates access rights for the first entity with respect to data stored in the second blockchain network.

4. The computer-implemented method of claim 1, wherein at least one of the first set of policies or the second set of policies indicates write permissions by the first entity to the second blockchain network.

5. The computer-implemented method of claim 1, wherein at least one of the first entity or the second entity is an individual or a computer network.

6. The computer-implemented method of claim 1, wherein the first set of policies is identified based on a network address associated with the first entity.

7. The computer-implemented method of claim 1, wherein the transaction relates to at least one of trust management, fraud and disputes, underwriting, data routing, policy enforcement, or member services.

8. The computer-implemented method of claim 1, wherein the first set of policies and the second set of policies are used for multiple transactions conducted with the first and second blockchain networks.

9. The computer-implemented method of claim 1, wherein the first set of policies and the second set of policies pertain to specific transaction types.

10. The computer-implemented method of claim 1, wherein the first set of policies and the second set of policies pertain to routing of the transaction.

11. A blockchain node server comprising:
a processor, and
a computer readable medium coupled to the processor, the computer readable medium comprising code for causing the processor to:
  receive, from a first entity associated with a first blockchain network, a request to conduct a transaction between the first entity and a second entity, the second entity associated with a second blockchain network;
  identify a first set of policies associated with the first blockchain network, by parsing a first smart contract associated with the first blockchain network, the first set of policies comprising a first interaction algorithm and a first set of security protocols;
  identify a second set of policies associated with the second blockchain network by parsing a second smart contract associated with the second blockchain network, the second set of policies comprising a second interaction algorithm and a second set of security protocols, wherein the first set of security protocols and the second set of security protocols ensure that the transaction is secure;
  generate another interaction algorithm based on the first set of policies and the second set of policies; and
  facilitate the transaction between the first entity and the second entity using the the first set of security protocols and the second set of security protocols, and by at least formatting, using the another interaction algorithm, a first message with information regarding the transaction in a first data format compatible with the first blockchain network and transmitting the first message to the first blockchain network, and formatting, using the another interaction algorithm, a second message with information regarding the transaction in a second data format compatible with the second blockchain network and different than the first data format, and transmitting the second message to the second blockchain network, wherein responsive to receiving the first message, the first blockchain network records the transaction on the first blockchain network, and responsive to receiving the second message, the second blockchain network records the transaction on the second blockchain network.

12. The blockchain node server of claim 11, wherein facilitating the transaction between the first entity and the second entity comprises translating between the first data format and the second data format.

13. The blockchain node server of claim 12, wherein translating between the first data format and the second data format comprises using an intermediary data format.

14. The blockchain node server of claim 11, wherein the first set of policies and the second set of policies are used for multiple transactions conducted with the first and second blockchain networks.

* * * * *